United States Patent
Wong et al.

(10) Patent No.: US 7,274,712 B2
(45) Date of Patent: Sep. 25, 2007

(54) SYSTEM AND METHOD OF OPERATING THE SYSTEM THAT RESPONDS TO CHANNEL CHANGE REQUESTS WITHOUT CAUSING MACRO-BLOCKING

(75) Inventors: Allen Tsz-Chiu Wong, San Jose, CA (US); Zhidan Cheng, Sunnyvale, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 1020 days.

(21) Appl. No.: 10/426,109

(22) Filed: Apr. 29, 2003

(65) Prior Publication Data

US 2004/0218543 A1 Nov. 4, 2004

(51) Int. Cl.
*H04H 1/04* (2006.01)
*H04J 1/00* (2006.01)
(52) U.S. Cl. .................. 370/486; 725/86; 725/100
(58) Field of Classification Search ........... 370/252, 370/351–356, 389, 485, 486, 487; 725/86, 725/87, 91, 98, 99, 95, 100, 101, 103
See application file for complete search history.

(56) References Cited

U.S. PATENT DOCUMENTS 7,123,592 B2 * 10/2006 Geile et al. ............... 370/307

| | | | |
|---|---|---|---|
| 2002/0163932 A1 * | 11/2002 | Fischer et al. | 370/465 |
| 2003/0056217 A1 | 3/2003 | Brooks | 725/46 |
| 2006/0010469 A1 * | 1/2006 | Reynolds et al. | 725/39 |
| 2006/0190963 A1 * | 8/2006 | Wagner et al. | 725/40 |

FOREIGN PATENT DOCUMENTS

EP 1 246 468 A2 10/2002
WO WO 00/54505 9/2000

OTHER PUBLICATIONS

W. Fenner, Request for Comments: 2236, Internet Group Management Protocol, Version 2, [online]. Xerox PARC, Nov. 1997, [retrieved on Feb. 21, 2003]. Retrieved from the Internet: <URL:http://www.ietf.org/rfc/rfc2236.txt?number=2236>. pp. 1-23.
S. Deering, Request for Comments: 1112, Host Extensions for IP Multicasting, [online]. Stanford University, Aug. 1989, [retrieved on Feb. 21, 2003]. Retrieved from the Internet: <URL:http://www.ietf.org/rfc/rfc1112.txt?number=1112<. pp. 1-16.

* cited by examiner

*Primary Examiner*—Ajlt Patel
(74) *Attorney, Agent, or Firm*—Mark C. Pickering

(57) ABSTRACT

A router stores a value that indicates the maximum number of channels that can be output to a group, and the number of channels that are output to the group. When a member of the group indicates a channel change selection from a first channel to a second channel, the router drops the first channel before outputting the second channel when the maximum number of channels and the number of channels are equal.

20 Claims, 5 Drawing Sheets

SYSTEM AND METHOD OF OPERATING THE SYSTEM THAT RESPONDS TO CHANNEL CHANGE REQUESTS WITHOUT CAUSING MACRO-BLOCKING

BACKGROUND OF THE INVENTION

1. Field of the Invention

The present invention relates to a system and a method of operating the system that responds to channel change requests and, more particularly, to a system and a method of responding to channel change requests that does not cause macro-blocking.

2. Description of the Related Art

A set top box is a device that provides a large number of television channel selections to a user. The set top box, which can be connected in parallel with other set top boxes, is connected to a router via a modem, such as an ADSL modem. The router receives a large number of television channels, and routes a specific television channel to the set top box in response to the selections made by the user.

FIG. 1 shows a block diagram that illustrates a prior-art communications network 100. As shown in FIG. 1, network 100 includes a router 110, such as the Telliant 5000 Central Office System manufactured by Advanced Fiber Communications. Router 110 has a channel table 112 that lists a series of television channels (Channel 1-Channel n) that are provided by the router. In addition, channel table 112 maintains a subscriber list for each of the television channels.

As further shown in FIG. 1, network 100 includes an ADSL modem 114 that is connected to router 110. ADSL modem 114, which is located at a customer premise (CP), has an input port that receives telephonic signals and data packets from, and transmits telephonic signals and data packets to, router 110. Further, modem 114 has a plain old telephone service (POTS) port connected to a residential telephone (not shown), and a data port.

As further shown in FIG. 1, network 100 also includes a first set top box STBA that is connected to the data port, a second set top box STBB that is connected to the data port, and a personal computer PC that is connected to the data port. Set top boxes STBA and STBB (and modem 114) form a group (modem 114 provides the physical interface). Although not shown, other groups of set top boxes are typically connected to router 110 via corresponding modems. In addition, network 100 includes two televisions TV1 and TV2 that are connected to the set top boxes STBA and STBB, respectively.

ADSL modem 114 is configured to deliver a first television channel to set top box STBA, and a second different television channel to set top box STBB. Each television channel requires a bandwidth of approximately 3.6 Mbps. Thus, 7.2 Mbps of bandwidth are required to support the two television channels. In the FIG. 1 example, modem 114 is also configured to provide approximately 0.8 Mbps of bandwidth for PC data communications. As a result, modem 114 has a maximum data rate of approximately 8 Mbps.

In operation, when set top box STBA is turned on, set top box STBA is subscribed to receive a selected television channel which, when television TV1 is also turned on, is displayed on the television screen. A user changes the channel received by set top box STBA and displayed by television TV1 by entering commands, usually via an infrared remote, into set top box STBA.

FIG. 2 shows a block diagram that illustrates a prior art state machine 200. State machine 200 implements the internet group management protocol—version two (IGMPv2), and can be utilized in a router, such as router 110, to route multicast data that represents television channels to the set top boxes.

As shown in FIG. 2, state machine 200 includes a No Members Present module 210, a Members Present module 212, and a Checking Membership module 214. (State machine 200 also includes a Version 1 Members Present module that provides backward compatibility and is not further discussed.)

In operation, when all of the set top boxes connected to the router are turned off, No Members Present module 210 of state machine 200 waits to detect a membership report. In addition, table 112 is empty. When a first set top box, such as box STBA, turns on, the box automatically subscribes to a particular television channel, e.g., the channel that was subscribed to when the box was last turned off. In the subscription process, the first set top box outputs an unsolicited version two (V2) membership report to the router that identifies the subscribed-to-television channel.

When state machine 200 receives the unsolicited V2 membership report, state machine 200 passes the report to Members Present module 212 where state machine 200 places the group that includes the first set top box in channel table 112 in the subscriber list of the subscribed-to-channel, and notifies the routing circuitry to transmit the subscribed-to-channel to the first set top box.

Thus, when the first set top box is a part of a first group G1 of a series of groups G1-Gn and is also subscribed to channel 1, state machine 200 adds first group G1 to the subscriber list of channel 1 when the unsolicited V2 membership report is received. FIG. 1 shows an example of group G1 added to table 112 to the subscriber list of channel 1. (In this example, groups G2-Gn are turned off and, thus, are not subscribed to any channel. As a result, groups G2-Gn are not shown in table 112.)

In addition to notifying the routing circuitry, state machine 200 also starts a general query timer that measures a query interval. When the query timer expires, indicating that the query interval has ended, state machine 200 outputs a general query to the groups in the subscription lists of the channels. The general query includes a maximum response time. In addition to outputting the general query, state machine 200 starts a response timer that measures the maximum response time.

In response to the general query, the groups output V2 membership reports. In the present example, the first set top box responds to a general query by outputting a V2 membership report representing first group G1 that indicates that the first set top box remains connected to the subscribed-to-channel.

After state machine 200 receives the V2 membership report from the first set top box, state machine 200 again starts the general query timer to measure the next query interval. On the other hand, if the first set top box has been turned off, state machine 200 receives no response and the response timer expires. In this case, state machine 200 passes the group and channel to No Members Present module 210 where state machine 200 removes group G1 (that includes the first set top box) from table 112 from the subscription list of the subscribed-to-channel.

When the first set top box remains on and a second set top box of the same group turns on, the second box automatically subscribes to a particular television channel. As above, in the subscription process, the second set top box outputs an unsolicited version two (V2) membership report to the router that identifies the subscribed-to-television channel.

When state machine 200 receives the unsolicited V2 membership report from the second set top box, state machine 200 passes the report to Members Present module 212 where state machine 200 places group G1 in channel table 112 in the subscriber list of the subscribed-to-channel, and notifies the routing circuitry to transmit the subscribed-to-channel to the second set top box.

Thus, when the second set top box is subscribed to channel n, state machine 200 adds group G1 to channel table 112 to the subscriber list of channel n. In addition, as above, state machine 200 measures a query interval for the second set top box. FIG. 1 shows an example of group G1 added to channel table 112 in the subscriber list of channel n.

When a user of the first set top box desires to change channels, such as from channel 1 to channel 2, the first set top box outputs a leave message to the router to indicate that the first set top box is leaving channel 1, followed by a V2 membership report that indicates that the first set top box is subscribed to channel 2.

However, before the router can stop sending channel 1, the router must make sure that another set top box in the same group is not receiving the same channel. Thus, when the router detects the leave message, state machine 200 passes the leave report to Checking Membership module 214 where state machine 200 outputs a group specific query to the members (the first and second set top boxes) of first group G1 to determine if any member (set top box) of first group G1 is subscribed to channel 1. In addition, state machine 200 also sets a group specific query timer and a retransmit timer.

The retransmit timer can be an integer multiple of the group specific timer. For example, the retransmit timer can have a value of two, while the group specific timer can have a value of four. When the retransmit timer expires, state machine 200 retransmits the group specific query and resets the retransmit timer. Thus, in the above example, the group specific query is transmitted twice before the group specific timer expires. The retransmission is a redundancy feature that minimizes the likelihood that lost or damaged packets will prevent the group specific query from being received.

In the present case, since none of the members of first group G1 are subscribed to the first channel (the first set top box is subscribed to the second channel, and the second set top box is subscribed to the nth channel), state machine 200 receives no response to the group specific query, and the group specific query timer expires.

(When both the first and second set top boxes are subscribed to the same television channel, e.g., channel 1, and the first set top box leaves the channel for another channel, first group G1 responds to the group specific query, thereby indicating that the second set top box remains subscribed to the channel. In this case, the router continues to send channel 1 to the second set top box.)

When the group specific timer expires, state machine 200 passes the expiration to No Members module 210 where state machine 200 notifies the routing circuitry to stop sending channel 1 to first group G1 (that includes the first set top box). In addition, state machine 200 also removes first group G1 from the subscription list of channel 1 in table 112, and clears the retransmit timer.

When state machine 200 receives the V2 membership report that identifies channel 2 as the subscribed-to-channel, state machine 200 passes the report to Members Present module 212 where state machine 200 places the group that includes the first set top box in the subscriber list of the subscribed-to-channel, and notifies the routing circuitry to transmit the subscribed-to-channel to the first set top box.

Thus, when the first set top box is subscribed to channel 2, state machine 200 adds first group G1, which includes the first set top box, to the subscriber list of channel 2.

One problem with the above method is that when both the first and second set top boxes are turned on and receiving different television channels, and one set top box requests a channel change, the router attempts to send three television channels of data to the ADSL modem for a short period of time. This is because state machine 200 notifies the routing circuitry to start sending channel 2 to the first set top box of first group G1 before state machine 200 notifies routing to stop sending channel 1 to first group G1. Thus, the short period of time begins when the router sends out the new channel (channel 2) to the ADSL modem, and ends when the group specific query expires.

For example, assume that the first set top box is receiving a first channel and a second set top box is receiving a third channel. Further assume that the first set top box requests to change from the first channel to the second channel. In this case, the router attempts to send the first, second, and third channels until the group specific query timer expires, at which time the router can stop sending the first channel.

When the router attempts to send three channels of data, the ADSL link becomes saturated because the router is attempting to send 10.8 Mbps of data (3 channels*3.6 Mbps/channel) over an 8.0 Mbps link. This is undesirable because the channel change can cause macro-blocking on the second set top box. In addition, the channel change also prevents a personal computer from sending and receiving data during this period of time.

Thus, there is a need for a router and a method of operating the router that responds to channel change requests without causing macro-blocking.

SUMMARY OF THE INVENTION

The present invention provides a system and a method of operating the system that responds to channel change requests without causing macro-blocking. The system includes a first register, a second register, and means for determining a maximum number of channels that can be received by an interface connected to a router, and storing the maximum number in the first register.

In addition, the system also includes means for determining a number of different channels that are being received by the interface, and storing the number in a second register. The system further includes means for detecting a channel change request from a set top box connected to the interface. The channel change request indicates a change from a first channel to a second channel.

The method of operating the system includes the steps of determining a maximum number of channels that can be received by the interface, and storing the maximum number in the first register. The method also includes the steps of determining a number of different channels that are being received by the interface, and storing the number in a second register. The method further includes the step of detecting a channel change request from a set top box connected to the interface. The channel change request indicates a change from a first channel to a second channel.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
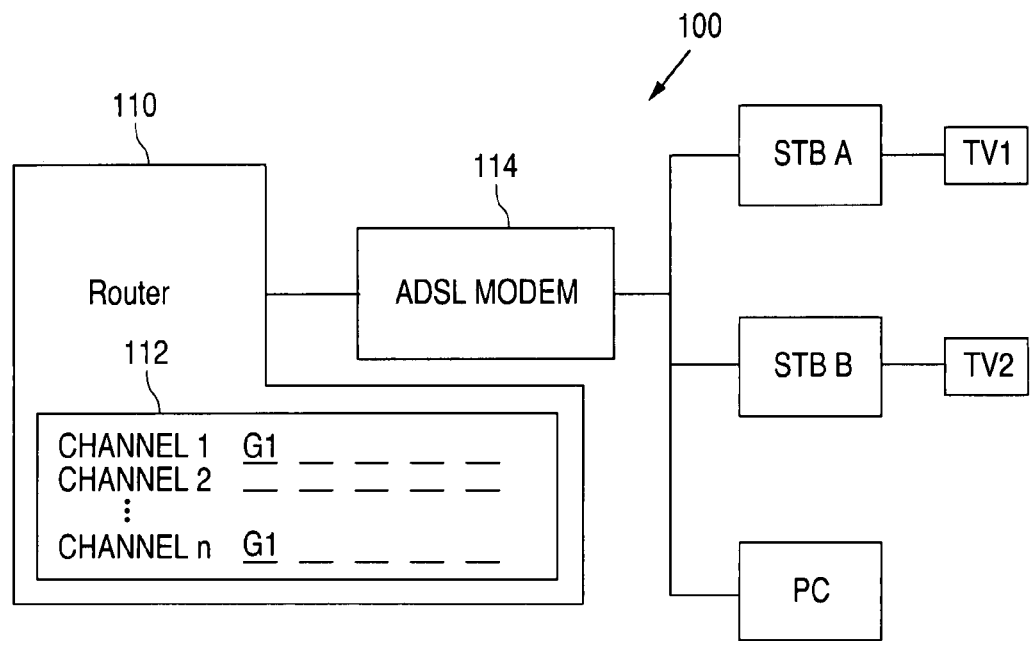
FIG. 1 is a block diagram illustrating a prior-art communications network 100.
Figure 3:
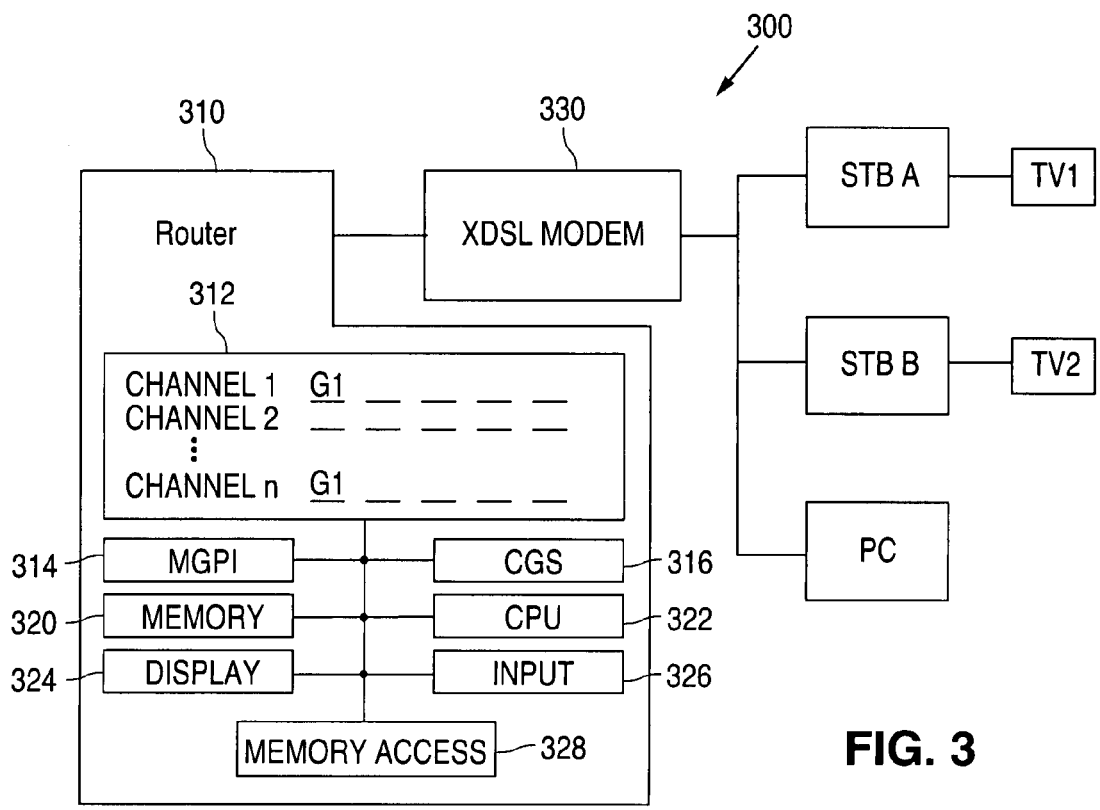
FIG. 3 is a block diagram illustrating an example of a communications network 300 in accordance with the present invention.
Figure 2:
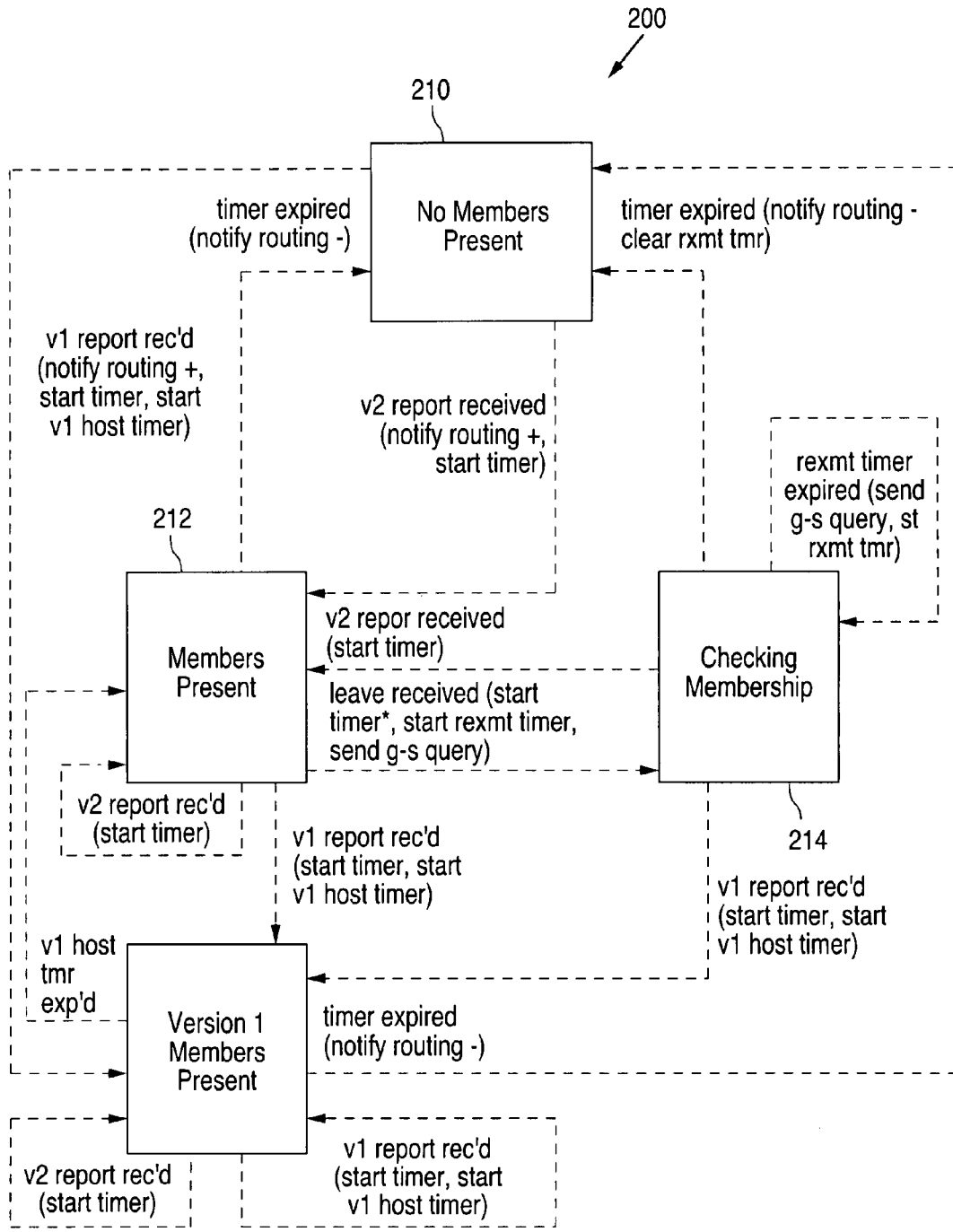
FIG. 2 is a block diagram illustrating a prior art state machine 200.

FIG. 3 shows a block diagram that illustrates an example of a communications network 300 in accordance with the present invention. As shown in FIG. 3, network 300 includes a router 310 and software that is executed by router 310. Router 310 has a channel table 312 that includes a television channel list that lists a series of television channels (Channel 1-Channel n) that are provided by the router. In addition, channel table 312 includes a subscriber list for each television channel that lists the groups that are subscribed to the channel.

Router 310 also has a first register 314 that stores a value that represents the maximum number of channels that can be received by a group, known as a maximum group per interface (MGPI) value, and a second register 316 that stores a value that represents the current number of different channels transmitted to the group, known as a current group subscribed (CGS) value.

As further shown in FIG. 3, router 310 further includes a memory 320 that stores the software and data. The software includes an operating system and a set of program instructions. The operating system can be implemented with, for example, the Linux operating system, although other operating systems can alternately be used. The program instructions can be written in, for example, C++ although other languages can alternately be used.

Further, router 310 includes a central processing unit (CPU) 322 that is connected to memory 320. CPU 322, which can be implemented with, for example, a 32-bit processor, operates on the data in response to the program instructions. Although only one processor is described, the present invention can be implemented with multiple processors in parallel to increase the capacity to process large amounts of data.

In addition, router 310 includes a display system 324 that is connected to CPU 322. Display system 324, which can be remotely located, allows images to be displayed to the user which are necessary for the user to interact with the program and configure the router. Router 310 also includes a user-input system 326 which is connected to CPU 322. Input system 326, which can be remotely located, allows the user to interact with the program.

Further, router 310 includes a memory access device 328, such as a disk drive or a networking card, which is connected to memory 320 and CPU 322. Memory access device 324 allows the processed data from memory 320 or CPU 322 to be transferred to an external medium, such as a disk or a networked computer. In addition, device 328 allows the program instructions to be transferred to memory 320 from the external medium.

In addition to router 310, network 300 also includes an xDSL modem 330 that is located at a customer premise (CP). Modem 330 has an input port that receives telephonic signals and data packets from, and transmits telephonic signals and data packets to, router 310. Further, modem 330 has a plain old telephone service (POTS) port, and a data port.

As further shown in FIG. 3, network 300 also includes a number of set top boxes, such as a first set top box STBA that is connected to the data port of modem 330, and a second set top box STBB that is connected to the data port of modem 330. In addition, network 300 includes a number of personal computers, such as a personal computer PC that is connected to the data port of modem 330. In addition, a number of televisions, televisions TV1 and TV2 in this example, are connected to the set top boxes STBA and STBB, respectively.

xDSL modem 330 is configured to deliver a number of television channels while at the same time providing bandwidth for PC data communications. For example, xDSL modem can be configured to deliver a first television channel to set top box STBA, and a second different television channel to set top box STBB. In addition, modem 330 is also configured to provide, for example, 0.8 Mbps of bandwidth for PC data communications.

In operation, when set top box STBA is turned on, set top box STBA is subscribed to receive a television channel which, when television TV1 is also turned on, is displayed on the television screen. A user changes the channel received by set top box STBA and displayed by television TV1 by entering commands, such as via an infra-red remote, into set top box STBA.

Figure 4:
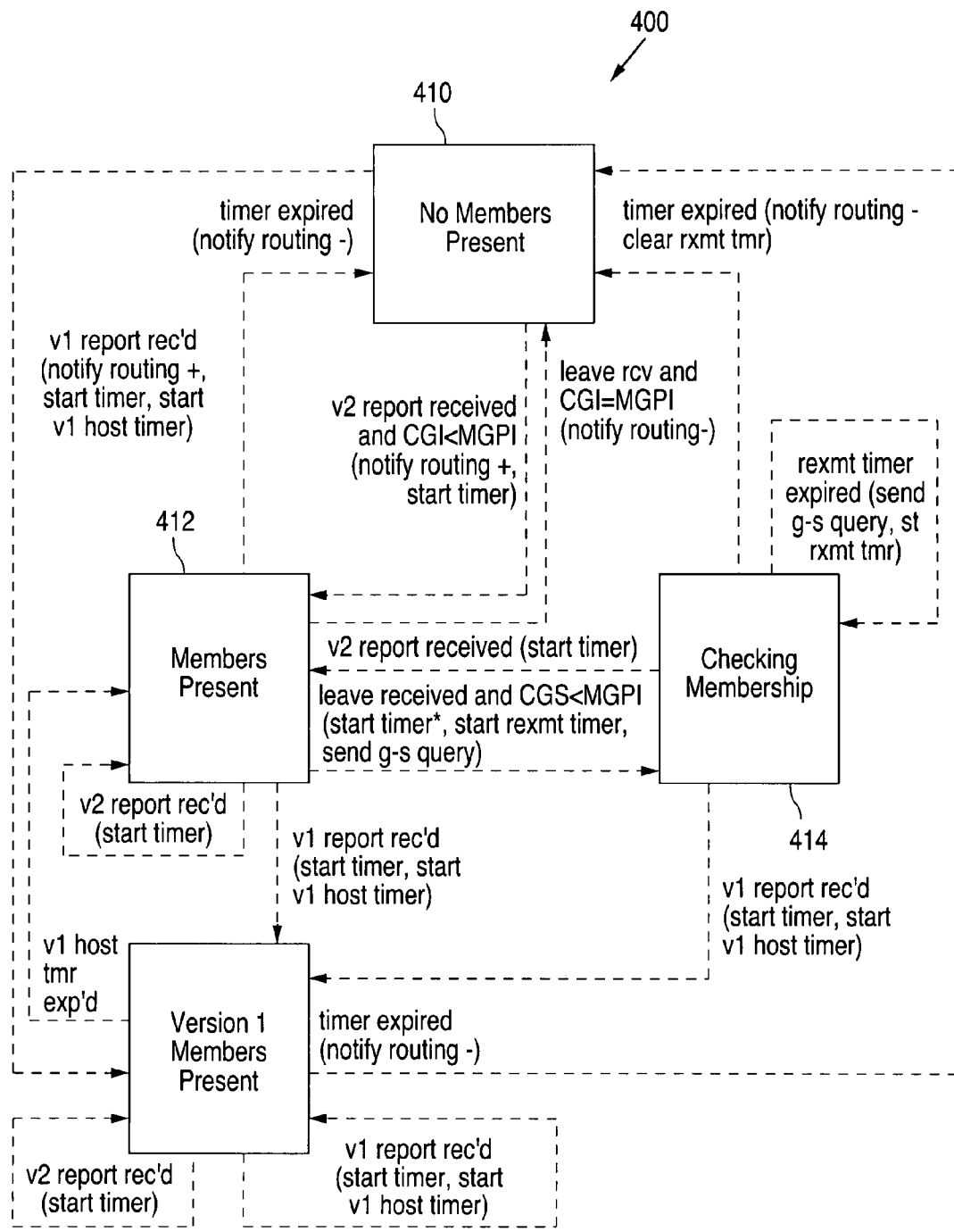
FIG. 4 is a block diagram illustrating a state machine 400 in accordance with the present invention.

FIG. 4 shows a block diagram that illustrates a state machine 400 in accordance with the present invention. State machine 400 implements the internet group management protocol—version two (IGMPv2), and can be utilized in a router, such as router 310, to route multicast data that represents television channels to the set top boxes.

As shown in FIG. 4, state machine 400 includes a No Members Present module 410, a Members Present module 412, and a Checking Membership module 414. (State machine 400 also includes a Version 1 Members Present module that provides backward compatibility. The Version 1 Members Present module and the version 1 (V1) reports and timers are discussed in Request for Comments 2236 by W. Fenner of The Internet Society, which is hereby incorporated by reference.)

State machine 400 operates the same as state machine 200 except that state machine 400 responds differently to the leave channel message that is output when a set top box changes from a first channel to a second channel. As shown in FIG. 4, when the leave channel message is received, state machine 400 passes the message directly to No Members Present module 410 when the maximum group per interface (MGPI) value stored by first register 314 is equal to the current group subscribed (CGS) value stored by second register 316.

In the present invention, when the current number of different channels transmitted to a group (CGS) value equals the maximum number of channels that can be output to the group (MGPI) value, the router can immediately stop sending the first channel because it is not possible for the set top boxes of the group to be subscribed to the same channel.

Thus, in the present invention, state machine 400 notifies the routing circuitry to immediately stop sending the first channel to the group that includes the leaving set top box. In addition, state machine 400 also removes the group from the subscription list of the first channel.

Since the router immediately stops sending the first channel, when the router begins sending the second television channel to the set top box, only two television channels are sent to modem 330. Thus, the present invention prevents the router from attempting to send more channels than the link can support, thereby preventing macro-blocking from occurring.

Figure 5A:
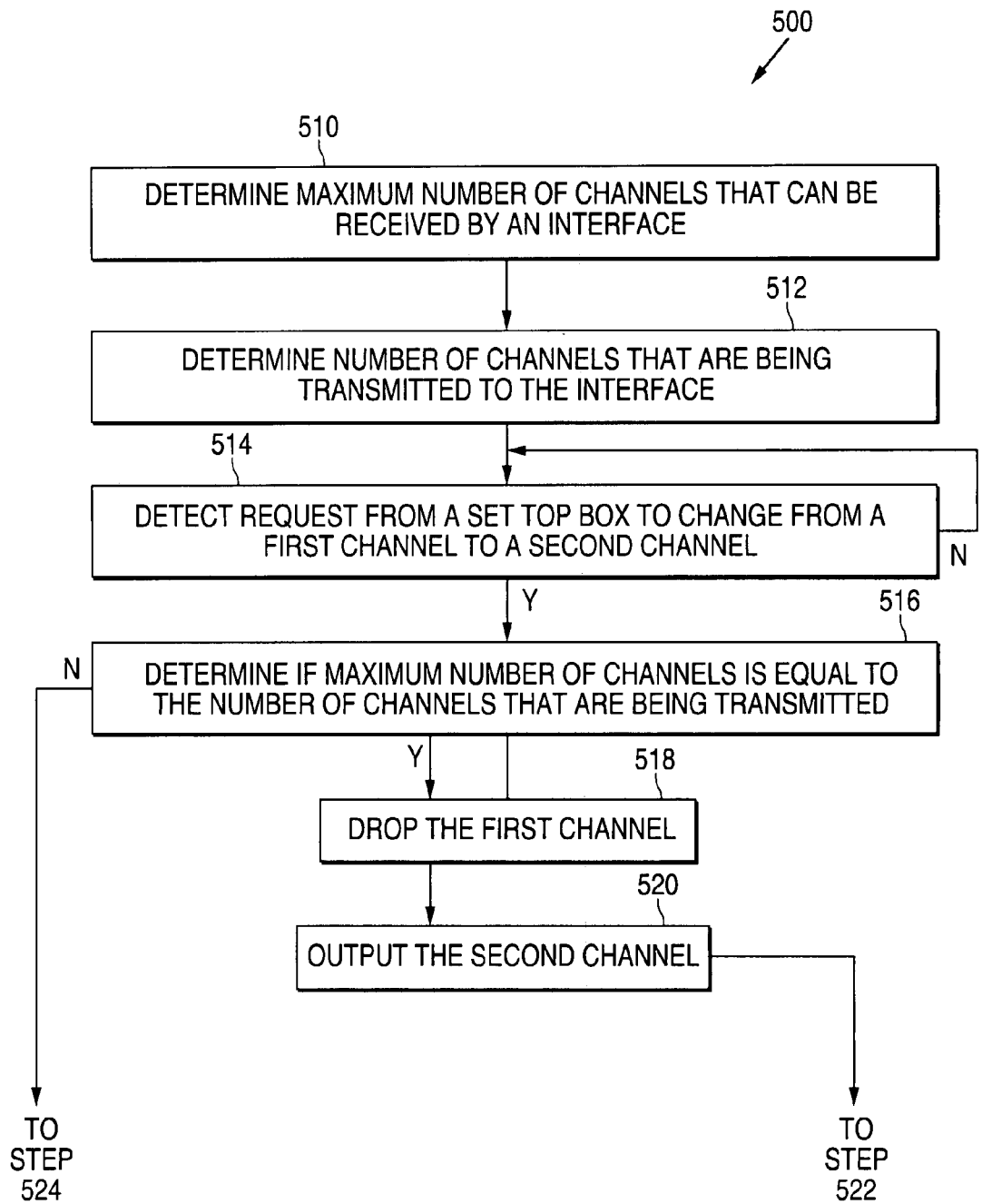
FIGS. 5A-5B are a flow chart illustrating an example of a method 500 of responding to a channel change request from a set top box in accordance with the present invention.
Figure 5B:
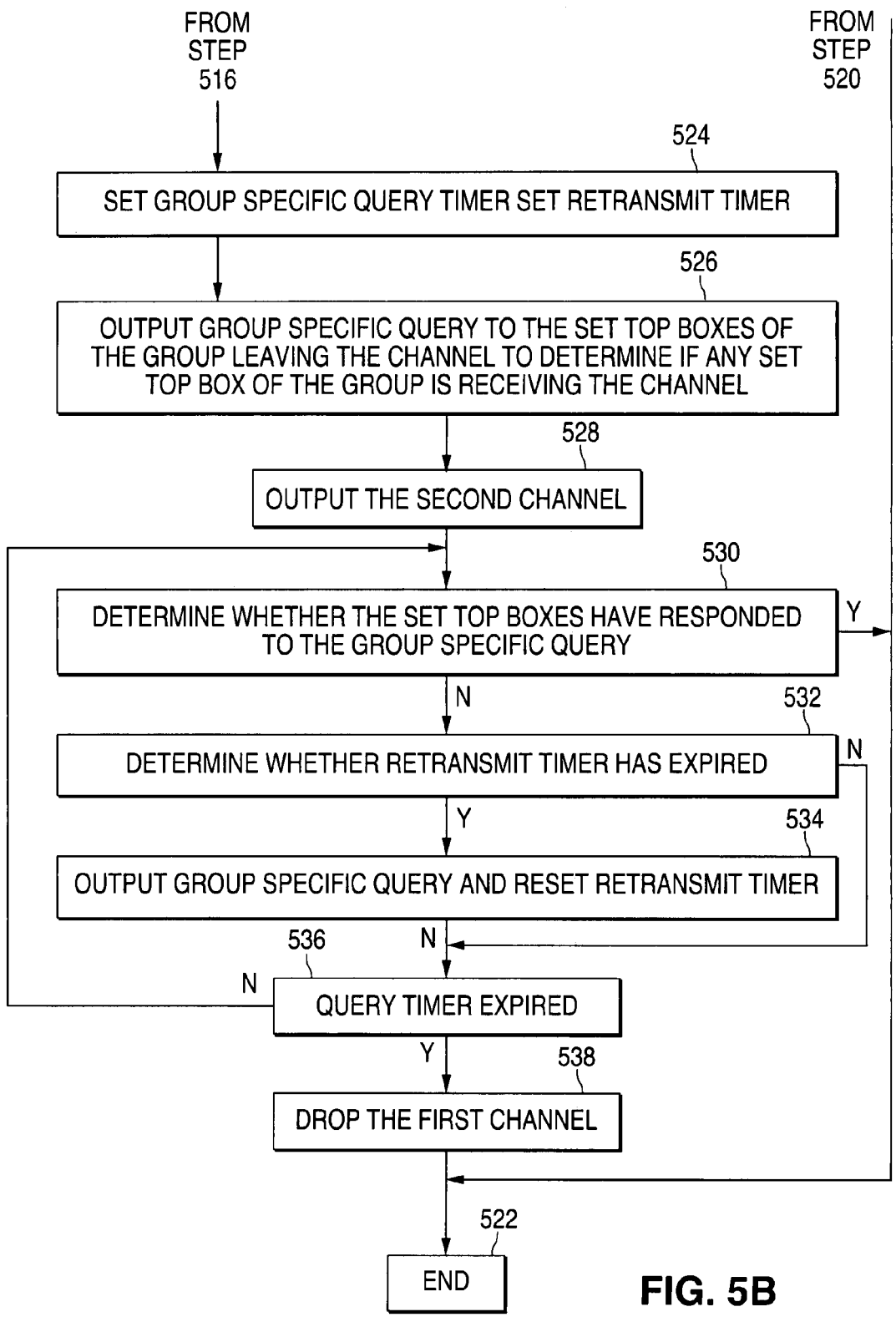

FIGS. 5A-5B show a flow chart that illustrates an example of a method 500 of responding to a channel change request from a set top box. Method 500 can be executed by, for example, router 310. As shown in FIGS. 5A-5B, method 500 begins in step 510 by determining the maximum number of channels that can be received by an interface, such as an XDSL modem. For example, a user can configure router 310 so that first register 314 stores an MGPI value that indicates the maximum number of channels that can be received by an interface. In this case, method 510 reads the MGPI value from register 314 to determine the maximum number of channels that can be received by an interface.

After the maximum number of channels has been determined, method 500 moves to step 512 to determine the number of different channels that are being transmitted to the interface. For example, router 310 can determine the number of channels that are being transmitted to the interface, e.g., the xDSL modem, and store a CGS value in second register 316 that represents this number.

In this case, method 510 reads the CGS value from register 316 to determine the number of channels being transmitted to the interface. Once the number of different channels being transmitted has been determined, method 500 moves to step 514 to detect a channel change request from a set top box that is connected to the interface.

When the router detects the channel change request, method 500 moves to step 516 where the router determines if the maximum number of channels is equal to the number of channels being transmitted to the interface. If the maximum number of channels is equal to the number of different transmitted channels, the method moves to step 518 to drop the previous (first) channel. Following this, method 500 moves to step 520 to output the new (second) channel, and then to step 522 to end.

On the other hand, if the maximum number of channels is less than the number of different received channels, method 500 moves to step 524 where the router sets a group specific query timer and a retransmit timer. Following this, method 500 moves to step 526 where the router outputs a group specific query to the set top boxes of the group leaving the channel to determine if any set top box of the group is receiving the channel.

As above, the retransmit timer can be an integer multiple of the group specific timer to allow the group specific query to be transmitted multiple times before the group specific query timer expires. The steps associated with the retransmit timer are optional. The retransmit timer adds redundancy to minimize the likelihood that lost or damaged packets will prevent the group specific query from being received.

Next, method 500 moves to step 528 to output the new (second) channel to the first set top box. After the new (second) channel has been output, method 500 moves to step 530 to determine whether the set top boxes have responded to the query. When none of the set top boxes have responded to the group specific query (e.g., the first set top box is subscribed to the new (second) channel, and the second set top box is turned off), method 500 moves to step 532 to determine whether the retransmit timer has timed out.

If the retransmit timer has timed out, method 500 moves to step 534 to again output the group specific query and reset the retransmit timer. Following this, method 500 moves to step 536 to determine whether the group specific query timer has timed out. In addition, when the retransmit timer has not timed out, method 500 moves to step 536.

If the group specific query timer has not timed out, method 500 returns to step 530. Method 500 continues to loop until a set top box responds to the group specific query, or the group specific query timer expires. When a set top box responds to the group specific query, thereby indicating that another set top box remains subscribed to the channel, method 500 moves from step 530 to step 522 to end. In this case, the router continues to send the channel.

When the group specific timer has expired, method 500 moves to step 538 where method 500 notifies the routing circuitry to stop sending the previous (first) channel to the group (that includes the first set top box). In addition, method 500 also removes the group from the subscription list of the previous (first) channel in table 112, and clears the retransmit timer.

Thus, a router and a method of operating the router have been described that allow the router to respond to television channel change commands from a set top box without allowing the router to attempt to transmit more television channels across the link than can be supported by the link. As a result, the present invention prevents macro-blocking when a set top box changes channels.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A system comprising:
a first register;
a second register;
means for determining a first value that represents a maximum number of channels that can be received by an interface connected to a router, and storing the first value in the first register;
means for determining a second value that represents a number of different channels that are being received by the interface, and storing the second value in a second register; and
means for detecting a channel change request from a set top box connected to the interface and, when a channel change request is detected, determining if the first value is equal to the second value, the channel change request indicating a change from a first channel to a second channel.

2. The system of claim 1 and further comprising means for, when the first value is equal to the second value, dropping the first channel.

3. The system of claim 2 and further comprising means for outputting the second channel after the first channel has been dropped.

4. The system of claim 3 wherein the set top box is a member of a group.

5. The system of claim 4 and further comprising, when the first value is not equal to the second value, means for outputting a group specific query to the group.

6. The system of claim 5 and further comprising means for outputting the second channel after the group specific query has been output, but before a response to the group specific query has been received.

7. The system of claim 3 wherein the router includes the first register and the second register.

8. The system of claim 3 wherein the channel change request includes:
   a leave message; and
   a membership report, the leave message indicating that the set top box is leaving the first channel, the membership report indicating that the set top box is subscribing to the second channel.

9. A method of operating a system, the system including a router connected to an interface, the system having a first register and a second register, the method comprising:
   determining a first value that represents a maximum number of channels that can be received by the interface, and storing the first value in the first register;
   determining a second value that represents a number of different channels that are being received by the interface, and storing the second value in the second register; and
   detecting a channel change request from a set top box connected to the interface and, when a channel change request is detected, determining if the first value is equal to the second value, the channel change request indicating a change from a first channel to a second channel.

10. The method of claim 9 and further comprising, when the first value is equal to the second value, dropping the first channel.

11. The method of claim 10 and further comprising outputting the second channel after the first channel has been dropped.

12. The method of claim 11 wherein the set top box is a member of a group, and further comprising, when the first value is not equal to the second value, outputting a group specific query to the group.

13. The method of claim 9 and further comprising outputting the second channel after the group specific query has been output, but before a response to the group specific query has been received.

14. The method of claim 11 wherein a plurality of set top boxes are connected to the interface.

15. The method of claim 11 wherein the channel change request includes:
   a leave message; and
   a membership report, the leave message indicating that the set top box is leaving the first channel, the membership report indicating that the set top box is subscribing to the second channel.

16. A computer-readable medium having stored thereon sequences of instructions, the sequences of instructions including instructions which, when executed by a computer, causes the computer to perform:
   determining a first value that represents a maximum number of channels that can be received by the interface, and storing the first value in the first register;
   determining a second value that represents a number of different channels that are being received by the interface, and storing the second value in the second register; and
   detecting a channel change request from a set top box connected to the interface and, when a channel change request is detected, determining if the first value is equal to the second value, the channel change request indicating a change from a first channel to a second channel.

17. The computer-readable medium of claim 16, further comprising instructions which, when executed by the computer, causes the computer to perform, when the first value is equal to the second value, dropping the first channel.

18. The computer-readable medium of claim 17, further comprising instructions which, when executed by the computer, causes the computer to perform outputting the second channel after the first channel has been dropped.

19. The computer-readable medium of claim 18, wherein the set top box is a member of a group, and further comprising instructions which, when executed by the computer, causes the computer to perform, when the first value is not equal to the second value outputting a group specific query to the group.

20. The computer-readable medium of claim 19, and further comprising instructions which, when executed by the computer, causes the computer to perform outputting the second channel after the group specific query has been output, but before a response to the group specific query has been received.

* * * * *

UNITED STATES PATENT AND TRADEMARK OFFICE
CERTIFICATE OF CORRECTION

PATENT NO. : 7,274,712 B2  Page 1 of 1
APPLICATION NO. : 10/426109
DATED : September 25, 2007
INVENTOR(S) : Wong et al.

It is certified that error appears in the above-identified patent and that said Letters Patent is hereby corrected as shown below:

<u>Column 7</u>,

Line 16, delete "XDSL" and replace with --xDSL--.

<u>Column 9</u>,

Line 40, delete "9" and replace with --12--.

Signed and Sealed this

Twenty-seventh Day of November, 2007

JON W. DUDAS
*Director of the United States Patent and Trademark Office*